United States Patent
Podszun et al.

(10) Patent No.: US 6,936,647 B2
(45) Date of Patent: Aug. 30, 2005

(54) BEAD POLYMERIZATES CONTAINING HALOGEN-FREE PHOSPHOURUS COMPOUNDS

(75) Inventors: Wolfgang Podszun, Köln (DE); Andreas Seidel, Dormagen (DE); Thomas Eckel, Dormagen (DE); Dieter Wittmann, Leverkusen (DE); Kamelia Karlou-Eyrisch, Düsseldorf (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/220,706
(22) PCT Filed: Feb. 26, 2001
(86) PCT No.: PCT/EP01/02216
§ 371 (c)(1),
(2), (4) Date: Nov. 13, 2002
(87) PCT Pub. No.: WO01/66636
PCT Pub. Date: Sep. 13, 2001

(65) Prior Publication Data
US 2003/0158303 A1 Aug. 21, 2003

(30) Foreign Application Priority Data
Mar. 9, 2000 (DE) .......................... 100 11 543

(51) Int. Cl.$^7$ ............................................. C08K 5/526
(52) U.S. Cl. .................... 524/141; 524/127; 524/145; 525/167; 525/169; 525/188; 526/193; 526/909
(58) Field of Search ................................. 526/193, 909; 525/167, 169, 188, 168; 524/127, 141, 145

(56) References Cited

U.S. PATENT DOCUMENTS

| | | | | |
|---|---|---|---|---|
| 3,726,839 A | * | 4/1973 | Jin .............................. 526/278 |
| 4,677,173 A | | 6/1987 | Holle et al. ................. 526/193 |
| 4,980,382 A | | 12/1990 | Sonnenberg et al. .......... 521/60 |
| 5,061,745 A | | 10/1991 | Wittmann et al. .......... 524/139 |
| 5,204,394 A | | 4/1993 | Gosens et al. .............. 524/125 |
| 5,658,974 A | | 8/1997 | Fuhr et al. .................. 524/127 |
| 5,672,645 A | | 9/1997 | Eckel et al. ................. 524/127 |
| 5,686,514 A | | 11/1997 | Bayha et al. ................ 524/145 |
| 5,733,957 A | | 3/1998 | Podszun et al. ............. 524/127 |
| RE36,902 E | | 10/2000 | Eckel et al. ................. 524/127 |

FOREIGN PATENT DOCUMENTS

| | | |
|---|---|---|
| DE | 196 48 799 | 5/1998 |
| DE | 196 50 370 | 6/1998 |
| GB | 2168707 | 6/1988 |
| GB | 966280 | 6/2000 |
| JP | 50-16825 | 2/1975 |
| JP | 52-4545 | 1/1977 |
| JP | 55-122075 | 9/1980 |

OTHER PUBLICATIONS

Principles of Polymerization, Third Edition, George Odian, p. 302, John Wiley & SOns Inc. 1991.*
** Database WPI, Section Ch, Week 200039 Derwent Publications Ltd., London, GB.
AN 2000–446908 XP002173858 & JP 2000 159822 A (Sumitomo Chem Co Ltd), Juni 13, 2000 ( Jun. 13, 2000) Zusammenfassung.
** Database WPI, Section Ch. Week 199436 Derwent Publications Ltd., London, GB.
AN 1994–290923 XP002173857 & JP 06 220110 A (Sekisui Plastics Co Ltd), Aug. 9, 1994 Zusammenfassung.

* cited by examiner

Primary Examiner—Peter Szekely
(74) Attorney, Agent, or Firm—Jill Denesvich

(57) ABSTRACT

The present invention relates to novel crosslinked bead polymers having an average particle size of 1 to 1000 μm containing specific, halogen-free phosphorus compounds including triphenyl phosphate as the halogen-free phosphorus compound, and to a process for the production of these bead polymers and to the use thereof as flame retardants in thermoplastics.

14 Claims, No Drawings

BEAD POLYMERIZATES CONTAINING HALOGEN-FREE PHOSPHOURUS COMPOUNDS

The present invention relates to novel crosslinked bead polymers having an average particle size of 1 to 1000 μm containing specific, halogen-free phosphorus compounds, to a process for the production of these bead polymers and to the use thereof as flame retardants in thermoplastics.

It has long been known to use phosphoric acid esters, in particular aromatic phosphoric acid esters, such as for example triphenyl phosphate, for imparting flame retardancy to thermoplastics. U.S. Pat. No. 5,061,745 describes, for example, polymer blends prepared from aromatic polycarbonate, ABS graft polymer and/or copolymer containing styrene and monophosphoric acid esters as flame retardant additive. However, the heat resistance of such moulding compositions is not adequate for many applications. Moreover, for many applications, these compounds have insufficiently low volatility and have the ability to migrate in the polymer composition, which, in the case of unfavourable processing conditions during injection moulding, may result in problems due to bleeding of the flame retardant additive and in the formation of unwanted soiling of the surfaces of the injection moulding tool.

U.S. Pat. No. 5,733,957 discloses specific polynuclear phosphoric acid esters for imparting flame retardancy. While the migration capacity of the phosphoric acid ester is indeed distinctly reduced in these compounds, as in the past they exhibit a very high plasticising action.

The same applies to oligomeric phosphoric acid esters, the use of which as flame retardants is described, for example, in EP-A 0 363 608 and EP-A 0 640 655.

JP 52004545 A describes microcapsules made from polyvinyl chloride, polyethylene or nylon, which have a tubular, spherical or pellet shape and may contain, for example, triphenyl phosphate as flame retardant. These microcapsules may be used to impart flame retardancy to foamed polyurethanes. However, when it comes to imparting flame retardancy to industrially significant thermoplastics, in particular those with an elevated processing temperature, such as for example polycarbonate, polyester (for example PET/PBT), polyamide and polyphenylene oxide/sulfide, these microcapsules offer no advantage over the free flame retardant as the capsule material softens or even melts under the processing conditions for such thermoplastics and the flame retardant is accordingly released during processing and not only in the event of a fire.

The same applies to the microcapsules which are described in JP 750 16825. In this case, flame retardants, such as for example tricresyl phosphate or tributyl phosphate, are enclosed in a shell of materials unstable at elevated temperatures, such as for example gelatine.

Microcapsules which contain flame retardants and are thermally stable at the processing temperatures of usual thermoplastics are also known. DE-A 3 543 414 accordingly describes microcapsules which contain a mixture of a halogenated organic flame retardant and an inorganic oxide, hydroxide, borate or phosphate and may be used for imparting flame retardancy to numerous typical thermoplastics. However, flame retardants containing halogen are environmentally and toxicologically questionable. The application does not disclose microcapsules containing halogen-free flame retardants, in particular halogen-free phosphoric acid esters.

The same applies to application JP 5512 2075, which describes microcapsules comprising flame retardants containing halogen and based on a thermoplastic polymer prepared from olefinically unsaturated monomer units. These capsules may be used to impart flame retardancy to textiles.

Bead polymers containing specific halogen-free phosphorus compounds have now been found which are universally suitable for imparting flame retardancy to thermoplastics, in particular including those which, by virtue of the melting or glass transition temperature thereof, may only be processed at elevated temperatures. Using the bead polymers according to the invention instead of the free, unencapsulated phosphorus compounds, reduces bleeding and vaporisation of the flame retardant additive, increases the heat resistance of the thermoplastics so rendered flame resistant and increases the effectiveness of the flame retardant.

The present invention accordingly provides novel, crosslinked bead polymers prepared from olefinically unsaturated compounds having an average bead size of 1 to 1000, preferably of 2 to 500, in particular of 5 to 100 μm, wherein these bead polymers contain halogen-free phosphorus compounds.

Preferred bead polymers are those prepared from
A) copolymer prepared from
  a) 70 to 99.7 wt. % of at least one monoolefinically unsaturated compound
  b) 0.3 to 30 wt. % of at least one polyolefinically unsaturated compound, and
B) at least one halogen-free phosphorus compound, wherein the content of phosphorus compound is 5 to 95, preferably 20 to 95, in particular 30 to 95 wt. %, relative to the bead polymer.

It has furthermore been found that the bead polymers according to the invention may be produced by finely dispersing
I) an organic phase prepared from 5 to 95, preferably 5 to 80, in particular 5 to 70 wt. % of a monomer mixture prepared from
  a) 70 to 99.7 wt. % of one or more monoolefinically unsaturated compounds
  b) 0.3 to 30 wt. % of one or more polyolefinically unsaturated compounds and
  5 to 95, preferably 20 to 95, in particular 30 to 95 wt. % of at least one halogen-free phosphorus compound,
  at least one initiator, and
  optionally one or more organic solvents sparingly miscible or immiscible with water,
II) in an aqueous phase prepared from
  water,
  at least one dispersant,
  and optionally a seed polymer
  with stirring at temperatures of between 0° C. and 60° C.,
III) then performing polymerisation with an increase in temperature and with stirring and
IV) subsequently separating any optionally present volatile, organic substances and isolating, washing and drying the resultant bead polymer.

For the purposes of the invention, "bead polymers according to the invention" should be taken to mean bead polymers containing halogen-free phosphorus compounds.

The present invention also provides the use of the bead polymers according to the invention as a flame retardant for thermoplastics, in particular including those having an elevated processing temperature.

It must be considered extremely surprising that the bead polymers according to the invention are more suitable for imparting flame retardancy to thermoplastics than the free, i.e. unencapsulated, phosphorus compounds. The bead polymers according to the invention may readily be incorporated into important plastics and are highly compatible therewith. Migration behaviour and the plasticising action of the phosphorus compound are distinctly reduced when the microencapsulated form is used.

The bead polymers according to the invention are spherical particles and consist of a polymer matrix and halogen-free phosphorus compounds interspersed therein.

The average particle size of the bead polymers determined by measuring and counting by means of a light microscope is 1 to 1000, preferably 2 to 500, in particular 5 to 100 μm. The nature and range of the particle size distribution does not restrict the usability of the bead polymers as a flame retardant.

The polymer matrix is a crosslinked polymer prepared from polymerisable olefinically unsaturated compounds.

The polymer matrix is preferably a copolymer prepared from polymerisable monoolefinically unsaturated compounds and polymerisable polyolefinically unsaturated compounds as the crosslinking agent.

Monoolefinically unsaturated compounds suitable according to the invention are, for example, vinyl aromatics, such as styrene, alpha-methylstyrene, vinyltoluene, vinylpyridine, acrylic and methacrylic compounds, $C_1$–$C_8$ alkyl acrylates, $C_1$–$C_8$ alkyl methacrylates, for example and preferably acrylic acid, methacrylic acid, acrylamide, methacrylamide, acrylonitrile, methyl methacrylate, ethyl acrylate, hydroxyethyl methacrylate, n-butyl acrylate, n-butyl methacrylate, isobutyl acrylate, isobutyl methacrylate, n-hexyl acrylate, n-hexyl methacrylate, ethylhexyl acrylate, ethylhexyl methacrylate, n-octyl acrylate, n-octyl methacrylate, decyl acrylate, decyl methacrylate, dodecyl acrylate, dodecyl methacrylate, stearyl acrylate, stearyl methacrylate, cyclohexyl acrylate, cyclohexyl methacrylate, 4-tert.-butylcyclohexyl methacrylate, benzyl acrylate, benzyl methacrylate, phenylethyl acrylate, phenylethyl methacrylate, phenylpropyl acrylate, phenylpropyl methacrylate, phenylnonyl acrylate, phenylnonyl methacrylate, 3-methoxybutyl acrylate, 3-methoxybutyl methacrylate, butoxyethyl acrylate, butoxyethyl methacrylate, diethylene glycol monoacrylate, diethylene glycol monomethacrylate, triethylene glycol monoacrylate, triethylene glycol monomethacrylate, tetraethylene glycol monoacrylate, tetraethylene glycol monomethacrylate, furfuryl acrylate, furfuryl methacrylate, tetrahydrofurfuryl acrylate or tetrahydrofurfuryl methacrylate or mixtures thereof. Vinylpyrrolidone, vinyl chloride, vinylidene chloride, vinyl acetate, vinyl propionate, vinyl laurate or vinyl adipate or mixtures thereof are also suitable.

Mixtures containing styrene or styrene and acrylonitrile are particularly preferred.

Polyolefinically unsaturated compounds for the purpose of the invention are olefinically unsaturated compounds having more than one polymerisable olefinically unsaturated group per molecule. The polyolefinically unsaturated compounds act as crosslinking agents. The following preferred compounds may be mentioned by way of example: allyl methacrylate, ethylene glycol dimethacrylate, ethylene glycol diacrylate, butanediol diacrylate, butanediol dimethacrylate, hexanediol dimethacrylate, triethylene glycol dimethacrylate, tetraethylene glycol dimethacrylate, trimethylolpropane triacrylate, pentaerythritol tetramethacrylate, triallyl isocyanurate and divinylbenzene or mixtures thereof.

Divinylbenzene is particularly preferred.

The proportion of crosslinking agent in the polymer matrix may be varied within a specific range. The content of crosslinking agent is generally between 0.3 and 30 wt. %, preferably between 0.5 and 15 wt. %, particularly preferably between 1 and 10 wt. %.

Quantities of up to 30 wt. % of polymers may be added to the polymerisable, olefinically unsaturated compounds, preferably polymers soluble in these compounds. Suitable polymers are for example polymethyl methacrylate, polystyrene, SAN copolymers or acrylate copolymers.

Halogen-free phosphorus compounds suitable according to the invention are monomeric or oligomeric phosphoric or phosphonic acid esters. Preferred compounds are those of the general formula (I)

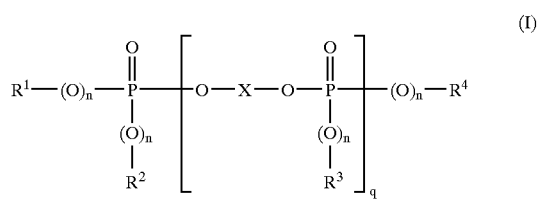

in which $R^1$, $R^2$, $R^3$ and $R^4$ mutually independently each mean a $C_1$ to $C_8$ alkyl, a $C_5$ to $C_6$ cycloalkyl optionally substituted by alkyl, preferably $C_1$–$C_4$ alkyl, an optionally likewise substituted $C_6$ to $C_{20}$ aryl or a $C_7$ to $C_{12}$ aralkyl, n mutually independently mean 0 or 1, preferably 1, q means an integer between 0 and 30, preferably from 0 to 15, particularly preferably from 0 to 10 and X means a mono- or polynuclear aromatic residue having 6 to 30 C atoms, or a linear or branched aliphatic residue having 2 to 30 C atoms, which may be OH-substituted and contain up to 8 ether bonds.

$R^1$, $R^2$, $R^3$ and $R^4$ preferably mutually independently denote $C_1$–$C_4$ alkyl, phenyl, naphthyl or phenyl-$C_1$–$C_4$-alkyl. The aromatic groups $R^1$, $R^2$, $R^3$ and $R^4$ may in turn be substituted with alkyl groups, preferably with $C_1$–$C_4$ alkyl. Particularly preferred aryl residues are cresyl, phenyl, xylenyl, propylphenyl or butylphenyl.

X in the formula (I) preferably means a mono- or polynuclear aromatic residue having 6 to 30 C atoms. Said residue is preferably derived from diphenols of the formula (II):

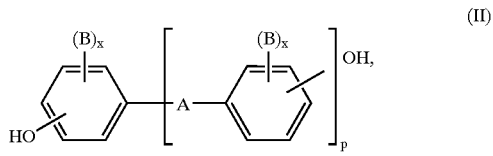

wherein

A is a single bond, $C_1$–$C_5$ alkylene, $C_2$-$C_5$ alkylidene, $C_5$–$C_6$ cycloalkylidene, —O—, —SO—, —CO—, —S—, —SO$_2$—, $C_6$–$C_{12}$ arylene, onto which may be fused further aromatic rings optionally containing heteroatoms, or a residue of the formula (III) or (IV)

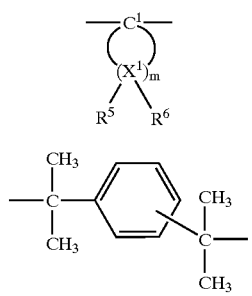

(III)

(IV)

B are in each case $C_1$–$C_{12}$ alkyl, preferably methyl x are mutually independently 0, 1 or 2, p is 1 or 0 and $R^5$ and $R^6$, individually selectably for each $X^1$, mutually independently mean hydrogen or $C_1$–$C_6$ alkyl, preferably hydrogen, methyl or ethyl, $X^1$ means carbon and m means an integer from 4 to 7, preferably 4 or 5, providing that on at least one atom $X^1$, $R^5$ and $R^6$ are simultaneously alkyl.

Preferred diphenols of the formula (II) are hydroquinone, resorcinol, dihydroxy-diphenols, bis(hydroxyphenyl)-$C_1$–$C_5$-alkanes, bis(hydroxyphenyl)-$C_5$–$C_6$-cyclo-alkanes, bis(hydroxyphenyl) ethers, bis(hydroxyphenyl) sulfoxides, bis(hydroxy-phenyl) ketones, bis(hydroxyphenyl) sulfones and α,α-bis(hydroxyphenyl)-diisopropylbenzenes.

X particularly preferably denotes

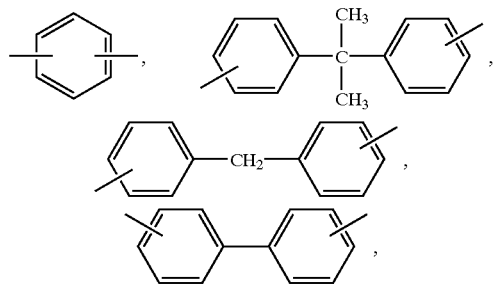

X in particular being derived from resorcinol, hydroquinone, bisphenol A or diphenylphenol.

Phosphorus compounds which may be used are monophosphates or monophosphonates (q=0), oligophosphates or oligophosphonates (q=1–30) or mixtures of mono- and oligo-compounds (0<q<30).

Preferred mixtures of mono- and oligo-compounds have q values of 0.1–30, in particular 0.5–10.

Monophosphorus compounds of the formula (I) are preferred, in particular tributyl phosphate, triphenyl phosphate, tricresyl phosphate, diphenylcresyl phosphate, diphenyloctyl phosphate, diphenyl-2-ethylcresyl phosphate, tri-(isopropylphenyl) phosphate, methylphosphonic acid dimethyl ester, methylphosphenic acid diphenyl ester, phenylphosphonic acid diethyl ester, triphenylphosphine oxide or tricresyl-phosphine oxide.

Triphenyl phosphate is particularly preferred.

The phosphorus compounds according to the formula (I) are known (c.f. for example EP-A 363 608, EP-A 640 655) or may be produced in an analogous manner using known methods (for example *Ullmanns Enzyklopädie der technischen Chemie*, vol. 18, pp. 301 et seq., 1979; Houben-Weyl, *Methoden der organischen Chemie*, vol. 12/1, p. 43; *Beilstein*, vol. 6, p. 177).

Polycyclic phosphoric acid esters of the formula (V)

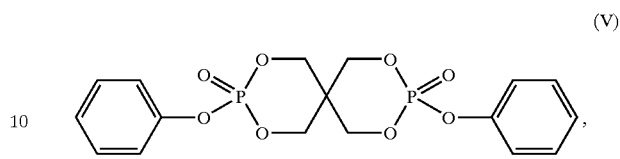

(V)

as are described in DE-A 2 921 325 may also be used as halogen-free phosphorus compounds.

The polynuclear phosphoric acid esters of the formula (VI) described in U.S. Pat. No. 5,733,957 may likewise be used

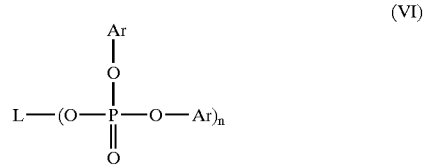

(VI)

in which

L is an n-valent linear or branched aliphatic hydrocarbon residue having 2 to 30 C atoms, which may be substituted with OH and may contain up to 8 ether bridges, Ar is an aryl residue or aralkyl residue and n is 2 to 6.

Preferred polynuclear phosphoric acid esters are those in which

L is an n-valent aliphatic hydrocarbon residue having 3 to 15 C atoms, which may be substituted with OH and may contain up to 3 ether bridges and n is 2 to 6.

Particularly suitable hydrocarbon residues L are, for example, the following:

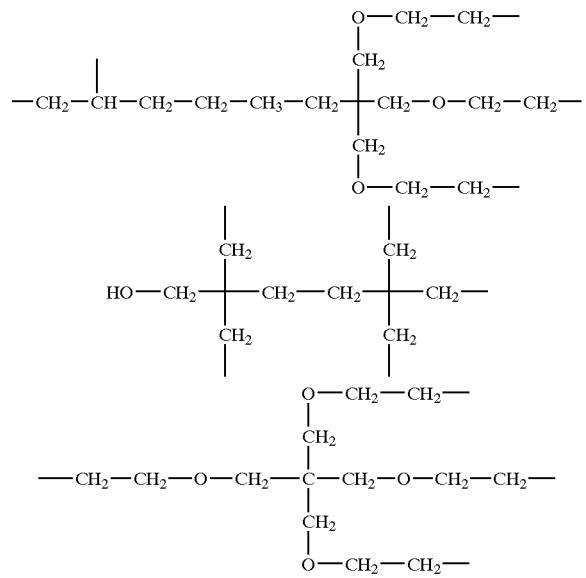

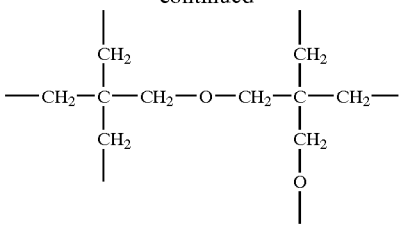

Ar in particular denotes phenyl, tolyl, xylenyl, p-octylphenyl, p-butylphenyl, naphthyl.

Ar particularly preferably denotes phenyl.

The following preferred polynuclear phosphoric acid esters may be mentioned by way of example:

Formula (VIIa)

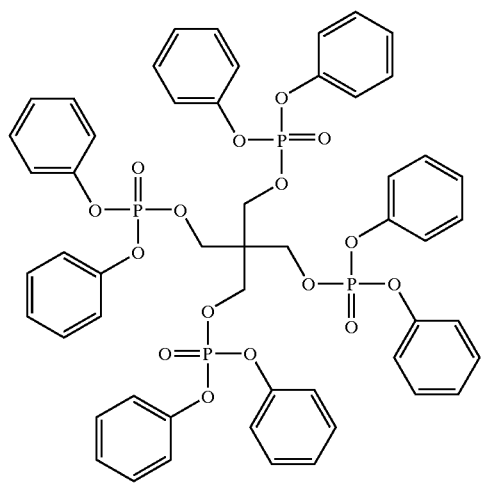

Formula (VIIb)

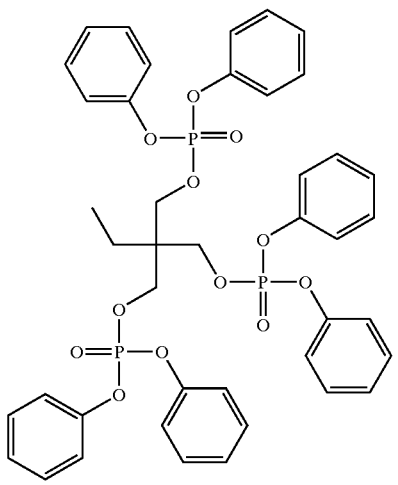

The polynuclear phosphoric acid esters may be used both in pure form and as a mixture of higher and lower molecular weight compounds.

Mixtures of any desired number of different phosphorus compounds described above may also be used.

The bead polymers according to the invention are produced using the suspension polymerisation method.

Suspension polymerisation is taken to mean a process in which a monomer or mixture containing monomer, which contains an initiator soluble in the monomer or monomer mixture, optionally mixed with additives, is subdivided in droplet form, in a phase which is substantially immiscible with the monomer or monomer mixture and contains a dispersant, and is cured by raising the temperature with stirring. Further details of suspension polymerisation are described, for example, in H. Greens, *Polymerisation Processes*, in *Ullmanns Encyclopedia of Industrial Chemistry*, volume A21, 5$^{th}$ edition (B. Elvers, S. Hawkins, G. Schulz, eds.), VCH, Weinheim 1992, pp. 363–373.

The bead polymers according to the invention may in particular be produced by finely dispersing an organic phase containing the above-stated polymerisable, olefinically unsaturated compounds, at least one of the halogen-free phosphorus compounds described above, at least one initiator and optionally an organic solvent sparingly miscible with water in an aqueous phase comprising water and at least one dispersant with stirring at temperatures of between 0° C. and 60° C., then performing polymerisation with an increase in temperature and with stirring and subsequently separating any optionally present volatile, organic substances and isolating and optionally washing and drying the resultant bead polymer.

The olefinically unsaturated compounds required as starting materials for the performance of the process according to the invention, including the crosslinking agents, have already been described above exhaustively.

Initiators which may be used in the performance of the process according to the invention are any substances conventionally usable for initiating polymerisation reactions. Oil-soluble initiators are preferably taken into consideration. Peroxy compounds, for example dibenzoyl peroxide, dilauryl peroxide, bis(p-chlorobenzoyl peroxide), dicyclohexyl peroxydicarbonate, tert.-butyl peroctoate, 2,5-bis(2-ethylhexanoylperoxy)-2,5-dimethylhexane and tert.-amylperoxy 2-ethylhexane may be mentioned by way of example, as may azo compounds, such as 2,2'-azobis(isobutyronitrile) and 2,2'-azobis(2-methylisobutyronitrile).

Dispersants which may be considered are any substances conventionally used for this purpose. Natural and synthetic water-soluble polymers, such as gelatine, starch and cellulose derivatives, in particular cellulose esters and cellulose ethers may preferably be mentioned, as may polyvinyl alcohol, polyvinylpyrrolidone, polyacrylic acid, polymethacrylic acid and copolymers of (meth)acrylic acid and (meth)acrylates and moreover methacrylic acid and methacrylic acid ester copolymers neutralised with alkali metal hydroxide. Conventional buffer reagents may be used to establish the pH value of the aqueous phase.

The process according to the invention is generally performed such that a mixture of the olefinically unsaturated compounds and the halogen-free phosphorus compound is initially produced. This mixture is generally homogeneous.

It is possible and, in many cases, advantageous, to use an auxiliary solvent in the production of the mixture. In this manner, it is possible to reduce the viscosity of the mixture and to increase the solubility of the phosphorus compound. Suitable auxiliary solvents are organic solvents which are sparingly miscible with water. Examples which may be mentioned are aromatic hydrocarbons, such as toluene and xylene, as well as halogenated hydrocarbons, such as tetrachloromethane, chloroform, methylene chloride and dichloroethane and moreover also esters, such as ethyl acetate.

The quantity ratios of the components used may be varied within a relatively large range during performance of the process according to the invention.

Initiators are generally used in quantities of between 0.05 and 2.5 wt. %, preferably of between 0.2 and 1.5 wt. %, relative to the monomer mixture.

The quantity of auxiliary solvent may amount to up to 300 wt. %, relative to the olefinically unsaturated compounds.

The quantity of aqueous phase is generally between 75 and 1200 wt. %, preferably between 100 and 500 wt. %, relative to the olefinically unsaturated compounds.

The quantity of dispersant is generally between 0.05 and 2 wt. %, preferably between 0.1 and 1 wt. %, relative to the aqueous phase.

In the first step of the process according to the invention, the organic phase is introduced into the aqueous phase with stirring. The temperature may be varied within a certain range. In general, temperatures of between 0° C. and 60° C., preferably of between 10° C. and 50° C., are used.

Polymerisation proceeds in the second step of the process according to the invention. The stirring speed is here of significance in establishing particle size. The average particle size of the bead polymers accordingly falls as the rotational speed of stirring rises. The exact rotational speed of stirring required to establish a specific, predetermined bead size is highly dependent in the individual case upon reactor size, reactor geometry and stirrer geometry.

Polymerisation temperature may be varied within a relatively large range. Said temperature is dependent upon the decomposition temperature of the initiator used. In general, temperatures of between 50° C. and 150° C., preferably of between 55° C. and 100° C., are used.

The duration of polymerisation is dependent upon the reactivity of the components involved. Polymerisation generally lasts between 30 minutes and several hours. It has proved effective to use a temperature program, in which polymerisation is begun at a low temperature, for example 70° C., and the reaction temperature is increased as polymerisation conversion proceeds.

Working up in the final step of the process according to the invention proceeds using conventional methods. The bead polymer may accordingly be isolated by filtration or decanting, for example, and optionally after washing, dried. Any auxiliary solvent possibly present, optionally together with a proportion of the water, may be removed from the resultant mixture by distillation.

The bead polymers according to the invention are excellently suitable for imparting flame retardancy to plastics or to blends of two or more different plastics, in particular also those which m-ay only be processed at elevated temperatures (for example greater than 200° C.).

Examples of thermoplastic plastics which may be mentioned are homo- and copolymers of olefinically unsaturated monomers such as polyfluoroethylene, polyethylene, polypropylene, ethylene/propylene copolymers, polystyrenes, styrene/acrylonitrile copolymers, (vinyl) graft polymers containing rubber, for example ABS copolymers (acrylonitrile/butadiene/styrene), vinyl chloride homo- and copolymers, polyacrylates, such as for example polymethyl methacrylate, vinyl acetate copolymers, polyacetals, polycarbonates, in particular polycarbonates based on bisphenol A and the derivatives thereof, polyesters, for example polyalkylene terephthalates, as well as polyester carbonates, polyamides, for example nylon 6 or nylon 6,6, polyester amides, polyphenylene oxides, polyphenylene sulfides, polysulfones, polyether sulfones or polyether ketones.

Mixtures of at least two of the above-stated plastics (polymer blends) may also be mentioned.

In principle, any thermoplastic plastics may be used, irrespective of the chemical and/or physical nature thereof and the method by which they were produced, for example by free-radically, thermally or redox-induced or acid- or base-catalysed solution, emulsion, suspension or bulk polymerisation.

The bead polymers according to the invention are particularly preferably used for imparting flame retardancy to those thermoplastics or mixtures of thermoplastics which are processed at elevated temperatures. Moulding compositions containing polycarbonates, polyesters, polyester carbonates, polyamides, polyester amides, polyphenylene oxides, polyphenylene sulfides or mixtures thereof may be mentioned by way of example. Blends which contain these thermoplastics together with other components, such as for example impact modifiers and/or vinyl polymers and/or compatibilising substances may in particular also be mentioned.

Polycarbonate moulding compositions and the impact-modified blends thereof are particularly preferred.

Particularly preferred compositions are those containing

A) 40 to 99, preferably 50 to 98.5 parts by weight of aromatic polycarbonate and/or polyester carbonate B) 0.5 to 60, preferably 1 to 40, in particular 2 to 25 parts by weight of graft polymer of B.1) 5 to 95, preferably 30 to 90 wt. % of one or more vinyl monomers on B.2) 95 to 5, preferably 10 to 70 wt. % of one or more grafting backbones having a glass transition temperature of <10° C., preferably of <0° C., particularly preferably of <−20° C., C) 0.1 to 50 parts by weight, preferably 1 to 40 parts by weight, particularly preferably 2 to 30 parts by weight of the above-stated bead polymers D) 0 to 30, preferably 0 to 20, particularly preferably 0 to 15 parts by weight of at least one thermoplastic polymer, selected from the group of vinyl (co)polymers and polyalkylene terephthalates, E) 0 to 5 parts by weight, preferably 0.1 to 3 parts by weight, particularly preferably 0.1 to 1 part by weight, very particularly preferably 0.1 to 0.5 parts by weight of a fluorinated polyolefin, wherein the sum of the parts by weight of all components is 100.

Aromatic polycarbonates, polyester carbonates and impact modifiers suitable according to the invention are described, for example, in EP-A 640 655 (U.S. Pat. No. 5,672,645).

Diphenols for the production of the aromatic polycarbonates and/or aromatic polyester carbonates are preferably those of the formula (VIII)

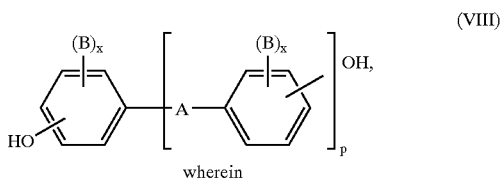

wherein

A is a single bond, $C_1$–$C_5$ alkylene, $C_2$–$C_5$ alkylidene, $C_5$–$C_6$ cycloalkylidene, —O—, —SO—, —CO—., —S—, —SO$_2$—, $C_6$–$C_{12}$ arylene, onto which may be fused further aromatic rings optionally containing heteroatoms, or a residue of the formula (IX) or (X)

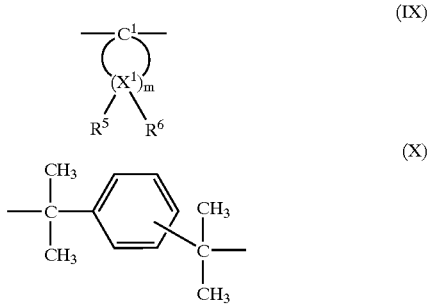

B are in each case $C_1-C_{12}$ alkyl, preferably methyl, halogen, preferably chlorine and/or bromine x are mutually independently 0, 1 or 2, p is 1 or 0 and $R^5$ and $R^6$, individually selectably for each $X^1$, mutually independently mean hydrogen or $C_1-C_6$ alkyl, preferably hydrogen, methyl or ethyl, $X^1$ means carbon and m means an integer from 4 to 7, preferably 4 or 5, providing that on at least one atom $X^1$, $R^5$ and $R^6$ are simultaneously alkyl.

Preferred diphenols are hydroquinone, resorcinol, dihydroxydiphenols, bis(hydroxy-phenyl)-$C_1-C_5$-alkanes, bis(hydroxyphenyl)-$C_5-C_6$-cycloalkanes, bis(hydroxyphenyl) ethers, bis(hydroxyphenyl) sulfoxides, bis(hydroxyphenyl) ketones, bis(hydroxy-phenyl) sulfones and α,α-bis(hydroxyphenyl)diisopropylbenzenes together with the ring-brominated and/or ring-chlorinated derivatives thereof.

Particularly preferred diphenols are 4,4'-dihydroxydiphenyl, bisphenol A, 2,4-bis(4-hydroxyphenyl)-2-methylbutane, 1,1-bis(4-hydroxyphenyl)cyclohexane, 1,1-bis(4-hydroxyphenyl)-3,3,5-trimethylcyclohexane, 4,4'-dihydroxydiphenyl sulfide, 4,4'-dihydroxydiphenyl sulfone together with the di- and tetrabrominated or chlorinated derivatives thereof, such as for example 2,2-bis(3-chloro-4-hydroxyphenyl)propane, 2,2-bis-(3,5-dichloro-4-hydroxyphenyl)propane or 2,2-bis(3,5-dibromo-4-hydroxyphenyl)propane.

2,2-Bis-(4-hydroxyphenyl)propane (bisphenol A) is in particular preferred.

The diphenols may be used individually or as any desired mixtures.

The diphenols are known from the literature or are obtainable using processes known from the literature (c.f. EP-A 640 655).

The thermoplastic, aromatic polycarbonates may be branched in known manner, specifically preferably by the incorporation of 0.05 to 2.0 mol %, relative to the sum of diphenols used, of trifunctional or greater than trifunctional compounds, for example those having three and more phenolic groups.

Both homopolycarbonates and copolycarbonates are suitable. Component A copolycarbonates according to the invention may be produced by also using 1 to 25 wt. %, preferably 2.5 to 25 wt. % (relative to the total quantity of diphenols used) of polydiorganosiloxanes having hydroxyaryloxy end groups. These are known (c.f. for example U.S. Pat. No. 3,419,634) or may be produced using processes known from the literature. The production of copolycarbonates containing polydiorganosiloxanes is described, for example, in DE-OS 3 334 782.

Apart from bisphenol A homopolycarbonates, preferred polycarbonates comprise the copolycarbonates of bisphenol A with up to 15 mol %, relative to the total number of moles of diphenols, of other diphenols described as preferred or particularly preferred, in particular 2,2-bis(3,5-dibromo-4-hydroxyphenyl)propane.

Aromatic dicarboxylic acid dihalides for the production of aromatic polyester carbonates are preferably the diacid dichlorides of isophthalic acid, terephthalic acid, 4,4'-diphenyl ether dicarboxylic acid and 2,6-naphthalenedicarboxylic acid.

Mixtures of the diacid dichlorides of isophthalic acid and of terephthalic acid in a ratio of between 1:20 and 20:1 are particularly preferred.

The aromatic polyester carbonates may also contain incorporated aromatic hydroxycarboxylic acids.

The aromatic polyester carbonates may be both linear and branched in known manner (c.f. in this connection also DE-OS 2 940 024 and DE-OS 3 007 934).

The proportion of carbonate structural units in the thermoplastic, aromatic polyester carbonates may be varied at will. The proportion of carbonate groups preferably amounts to up to 100 mol %, in particular up to 80 mol %, particularly preferably up to 50 mol %, relative to the sum of ester groups and carbonate groups. Both the ester and the carbonate portions of the aromatic polyester carbonates may be present in the form of blocks or randomly distributed in the polycondensation product.

The relative solution viscosity ($\eta_{rel}$) of the aromatic polycarbonates and polyester carbonates is in the range 1.18 to 1.4, preferably 1.22 to 1.3 (measured on solutions of 0.5 g of polycarbonate or polyester carbonate in 100 ml of methylene chloride at 25° C.).

The thermoplastic, aromatic polycarbonates and polyester carbonates may be used alone or in any desired mixture with each other.

Suitable graft polymers are one or more graft polymers of

B.1 5 to 95, preferably 30 to 90 wt. %, of at least one vinyl monomer on

B.2 95 to 5, preferably 70 to 10 wt. %, of one or more grafting backbones having glass transition temperatures of <10° C., preferably of <0° C., particularly preferably of <−20° C.

The grafting backbone B.2 generally has an average particle size ($d_{50}$ value) of 0.05 to 5 μm, preferably of 0.10 to 2 μm, particularly preferably of 0.20 to 1 μm.

Monomers B.1. are preferably mixtures of

B1.1 50 to 99 parts by weight of vinyl aromatics and/or ring-substituted vinyl aromatics (such as for example styrene, α-methylstyrene, p-methylstyrene, p-chlorostyrene) and/or methacrylic acid ($C_1-C_8$)-alkyl esters (such as for example methyl methacrylate, ethyl methacrylate) and B.1.2 1 to 50 parts by weight of vinyl cyanides (unsaturated nitrites such as acrylonitrile and methacrylonitrile) and/or (meth)acrylic acid ($C_1-C_8$)-alkyl esters (such as for example methyl methacrylate, n-butyl acrylate, t-butyl acrylate) and/or derivatives (such as anhydrides and imides) of unsaturated carboxylic acids (for example maleic anhydride and N-phenylmaleimide).

Preferred monomers B.1.1 are selected from among at least one of the monomers styrene, α-methylstyrene, methyl methacrylate; preferred monomers B. 1.2 are selected from among at least one of the monomers acrylonitrile, maleic anhydride and methyl methacrylate.

Particularly preferred monomers are B.1.1 styrene and B.1.2 acrylonitrile.

Grafting backbones B.2 suitable for the graft polymers B are, for example, diene rubbers, EP(D)M rubbers, i.e. those based on ethylene/propylene and optionally diene, acrylate, polyurethane, silicone, chloroprene and ethylene/vinyl acetate rubbers.

Preferred grafting backbones B.2 are diene rubbers (for example based on butadiene, isoprene etc.) or mixtures of diene rubbers or copolymers of diene rubbers or the mixtures thereof with further copolymerisable monomers (for example according to B.1.1 and B.1.2), providing that the glass transition temperature of component B.2 is below <10° C., preferably <0° C., particularly preferably <−10° C.

Pure polybutadiene rubber is particularly preferred.

Particularly preferred polymers B are, for example, ABS polymers (emulsion, bulk and suspension ABS), as are described, for example, in DE-OS 2 035 390 (=U.S. Pat. No. 3,644,574) or in DE-OS 2 248 242 (=GB patent 1 409 275) or in Ullmann, Enzyklopädie der technischen Chemie, vol. 19 (1980), pp. 280 et seq. The gel content of the grafting backbone B.2 is at least 30 wt. %, preferably at least 40 wt. % (measured in toluene).

The graft copolymers B are produced by free-radical polymerisation, for example by emulsion, suspension, solution or bulk polymerisation, preferably by emulsion polymerisation.

Particularly suitable graft rubbers are also ABS polymers produced according to U.S. Pat. No. 4,937,285 by redox initiation with an initiator system comprising organic hydroperoxide and ascorbic acid.

Suitable acrylate rubbers according to B.2 of the polymers B are preferably polymers prepared from acrylic acid alkyl esters, optionally with up to 40 wt. %, relative to B.2, of other polymerisable, ethylenically unsaturated monomers. Preferred polymerisable acrylic acid esters include $C_1$–$C_8$ alkyl esters, for example methyl, ethyl, butyl, n-octyl and 2-ethylhexyl esters; haloalkyl esters, preferably halo-$C_1$–$C_8$-alkyl esters, such as chloroethyl acrylate together with mixtures of these monomers.

Monomers having more than one polymerisable double bond may be copolymerised for crosslinking purposes. Examples of crosslinking monomers are stated in EP-A 640 655.

Preferred "other" polymerisable, ethylenically unsaturated monomers, which, apart from the acrylic acid esters, may optionally be used to produce the grafting backbone B.2 are, for example, acrylonitrile, styrene, β-methylstyrene, acrylamides, vinyl $C_1$–$C_6$-alkyl ethers, methyl methacrylate, butadiene. Preferred acrylate rubbers as the grafting backbone B.2 are emulsion polymers having a gel content of at least 60 wt. %.

Further suitable grafting backbones B.2 are silicone rubbers having active grafting sites, as are described in DE-OS 3 704 657, DE-OS 3 704 655, DE-OS 3 631 540 and DE-OS 3 631 539.

The gel content of the grafting backbone B.2 is determined at 25° C. in a suitable solvent (M. Hoffmann, H. Krömer, R. Kuhn, Polymeranalytik I & II, Georg Thieme Verlag, Stuttgart 1977).

The average particle diameter $d_{50}$ is the diameter both above and below which lie 50 wt. % of the particles. This value may be determined by ultracentrifuge measurements (W. Scholtan, H. Lange, Kolloid Z. & Z. Polymere 250 (1972), 782–796).

Fluorinated polyolefins E as may be used according to the invention are described in EP-A 640 655.

The bead polymer containing flame retardant may be incorporated into the thermoplastic in known manner by mixing the bead polymer with the polymer or polymer mixture at room temperature or at elevated temperature and performing melt-compounding or melt-extrusion at temperatures above the melting temperature of the polymers in conventional apparatus, such as for example internal kneaders, extruders or twin-screw extruders.

Conventional additional additives, such as antidrip agents, lubricants and mould release agents, nucleating agents, antistatic agents, stabilisers, dyes and pigments together with fillers and reinforcing materials may be added to the moulding composition during this compounding or in another compounding step.

The following Examples illustrate the invention.

EXAMPLES

Example 1

Production of a Crosslinked SAN Bead Polymer Containing Triphenyl Phosphate 52.88 g of styrene, 17.62 g of acrylonitrile, 4.5 g of divinylbenzene and 75 g of triphenyl phosphate are mixed to yield a homogeneous solution and then stirred together at room temperature with 0.75 g of dibenzoyl peroxide. The solution is transferred into a stirred reactor, which had previously been filled with 0.3 liters of a 1 wt. %, aqueous alkaline solution, adjusted to a pH value of 8 with sodium hydroxide solution, of a copolymer prepared from 50 wt. % of methacrylic acid and 50 wt. % of methyl methacrylate. The copolymer acts as a colloid stabiliser. At a temperature of 78° C., the mixture is stirred for 13 h at a stirrer speed of 600 rpm and the reactor is then cooled to room temperature. The resultant cured beads are filtered out, washed with water and dried at 50° C. in a drying cabinet. 135 g of a transparent bead polymer having an average particle size of approx. 30 µm and a phosphorus content of 4.9% (corresponding to 51.6% TPP) were obtained. Thermogravimetric analysis (TGA) of the bead polymer shows that decomposition of the SAN phase does not begin until temperatures of between 350 and 400° C. TGA was performed dynamically at a heating rate of 10 K/min on a sample of approx. 2.5 mg under a stream of nitrogen (50 ml/min).

Example 2

Production of a Crosslinked Bead Polymer Based on Styrene, Acrylonitrile and Ethylhexyl Acrylate Containing Triphenyl Phosphate 372 g of styrene, 144 g of acrylonitrile, 24 g of ethylhexyl acrylate, 60 g of divinylbenzene and 600 g of triphenyl phosphate are mixed to yield a homogeneous solution and then stirred together at room temperature with 6 g of dibenzoyl peroxide. The solution is transferred into a stirred reactor, which had previously been filled with 2.4 liters of a 1 wt. %, aqueous alkaline solution, adjusted to a pH value of 8 with sodium hydroxide solution, of a copolymer prepared from 50 wt. % of methacrylic acid and 50 wt. % of methyl methacrylate. The copolymer acts as a colloid stabiliser. At a temperature of 78° C., the mixture is stirred for 16 h at a stirrer speed of 250 rpm and the reactor is then cooled to room temperature. The resultant cured beads are filtered out, washed with water and dried at 50° C. in a drying cabinet. 1085 g of a transparent bead polymer having an average particle size of approx. 40 µm and a phosphorus content of 4.7% (corresponding to 49.5% TPP) were obtained. Thermogravimetric analysis (TGA) of the bead polymer shows that decomposition of the SAN phase does not begin until temperatures of between 350 and 400° C. TGA was performed dynamically at a heating rate of 10 K/min on a sample of approx. 2.5 mg under a stream of nitrogen (50 mi/min).

Example 3
Production of an Impact-Modified Polycarbonate Moulding Composition with a Crosslinked Bead Polymer Based on Styrene and Acrylonitrile Containing TPP The following components were mixed:

32.1 parts by weight
  A1: bisphenol A-based polycarbonate with a relative solution viscosity of 1.28, measured in methylene chloride at 25° C. and at a concentration of 0.5 g/100 ml, 32.1 parts by weight
  A2: bisphenol A-based polycarbonate with a relative solution viscosity of 1.20, measured in methylene chloride at 25° C. and at a concentration of 0.5 g/100 ml, 4.5 parts by weight
  B: graft polymer produced by emulsion polymerisation of 45 parts by weight of styrene and acrylonitrile in a ratio of 72:28 on 55 parts by weight of a particulate, crosslinked polybutadiene rubber (average particle diameter $d_{50}$=0.3 to 0.4 μm), 3.4 parts by weight
  D: styrene/acrylonitrile copolymer with a styrene/acrylonitrile ratio of 72:28 and an intrinsic viscosity at 0.55 dl/g (measured in dimethylformamide at 20° C.), 4.2 parts by weight
  E: polytetrafluoroethylene preparation with 10 wt. % PTFE and 90 wt. % graft polymer (B2), produced by acidic coprecipitation of a mixture of emulsions of both components, and 23.1 parts by weight
  C1: SAN bead polymer containing TPP according to Example 1.

The components are mixed at 200° C. in a 0.05 l internal kneader.

In order to measure the Vicat B120 temperatures, compression moulded sheets are produced from the pelletised moulding composition at 220° C., from which sheets standard test specimens are sawn. The Vicat temperature is measured to ISO 306.

Melt viscosity is determined at 260° C. and shear rates of 100 to 1500 $s^{-1}$.

The tendency of the flame retardant to bleed or vapourise is assessed from the results of investigation by TGA. Approx. 2.5 mg of the moulding composition compounded as described above are heated dynamically at a rate of 10 K/min starting from room temperature under a stream of nitrogen (50 ml/min). The percentage loss of mass determined at a temperature of 280° C. (which corresponds to a typical processing temperature of such PC/ABS moulding compositions) is used as a measure of the tendency of the flame retardant additive to bleed.

Comparative Example 1
Production of an Impact-Modified Polycarbonate Moulding Composition with Free TPP The following components were mixed:

32.1 parts by weight of polycarbonate A1, 32.1 parts by weight of polycarbonate A2, 4.5 parts by weight of graft polymer B, 14.6 parts by weight of styrene/acrylonitrile copolymer D, 4.2 parts by weight of polytetrafluoroethylene preparation E, and 11.9 parts by weight C2: triphenyl phosphate (Disflamoll TP, Bayer AG, Leverkusen, Germany).

The moulding compositions and test specimens were produced and tested as described in Example 3.

Example 4
Production of an Impact-Modified Polycarbonate Moulding Composition with a Crosslinked Bead Polymer Based on Styrene and Acrylonitrile Containing TPP The following components were mixed:

32.1 parts by weight of polycarbonate A1, 32.1 parts by weight of polycarbonate A2, 4.5 parts by weight of graft polymer B, 4.2 parts by weight of polytetrafluoroethylene preparation E, 0.4 parts by weight of a mould release agent, 0.1 parts by weight of a phosphite stabiliser, 25.1 parts by weight
  C3: SAN bead polymer containing TPP with a TPP content of 47.4 wt. %, which was produced in a similar manner to Example 1, but in an 8 times larger batch, and 1.4 parts by weight
  C4: crosslinked, TPP-free SAN bead polymer which was produced in a similar manner to Example 1, but omitting the triphenyl phosphate.

The components are mixed in a 1.3 l internal kneader. The mouldings are produced on an Arburg model 270E injection moulding machine at 240° C.

Notched impact strength is measured at room temperature to ISO 180-1A.

The Vicat B120 temperature and melt viscosity are measured as described in Example 3.

Flame resistance is determined to UL94V at a wall thickness of 3.2 mm.

Stress cracking (ESC) behaviour is investigated on bars of dimensions 80×10×4 mm. The test medium used is a mixture of 60 vol. % toluene and 40 vol. % isopropanol. The test specimens are prestressed using an arc template and immersed in the test medium for 5 minutes at room temperature. Stress cracking behaviour is assessed on the basis of the minimum relative outer fibre strain which is required for the bar to break within the 5 minute's exposure time in the test medium.

Comparative Example 2
Production of an Impact-Modified Polycarbonate Moulding Composition with Free TPP and Crosslinked, TPP-Free SAN Bead Polymer The following components were mixed:

32.1 parts by weight of polycarbonate A1, 32.1 parts by weight of polycarbonate A2, 4.5 parts by weight of graft polymer B, 4.2 parts by weight of polytetrafluoroethylene preparation E, 0.4 parts by weight of a mould release agent, 0.1 parts by weight of a phosphite stabiliser, 14.6 parts by weight of a TPP-free, crosslinked SAN bead polymer C4, and 11.9 parts by weight of triphenyl phosphate C2.

The moulding compositions and test specimens were produced and tested as described in Example 4.

TABLE 1

|  | Comparison 1 | Example 3 |
|---|---|---|
| Viscosity (260° C., 100 s$^{-1}$) [Pa · s] | 223 | 384 |
| Viscosity (260° C., 1000 s$^{-1}$) [Pa · s] | 100 | 173 |
| Viscosity (260° C., 1500 s$^{-1}$) [Pa · s] | 88 | 136 |
| Vicat B 120 [° C.] | 86 | 91 |
| TGA (loss of mass at 280° C.) [%] | −3.76 | −3.34 |

TABLE 2

|  | Comparison 2 | Example 4 |
|---|---|---|
| $a_k$ (23° C.) [kJ/m$^2$] | 8 | 8 |
| ESC (outer fibre strain at failure) [%] | 1.0 | 1.4 |
| Viscosity (260° C., 100 s$^{-1}$) [Pa · s] | 242 | 318 |
| Viscosity (260° C., 1000 s$^{-1}$) [Pa · s] | 126 | 158 |
| Viscosity (260° C., 1500 s$^{-1}$) [Pa · s] | 109 | 133 |
| Vicat B 120 [° C.] | 86 | 88 |
| UL 94 V at 3.2 mm (total burn time) | failed | V0 (19 s) |

Apart from the added additives, Examples 3 and 4 and Comparative Examples 1 and 2 differ only in the manner in which the flame retardant triphenyl phosphate and the styrene/acrylonitrile copolymer are present. All the moulding compositions contain 11.9 parts by weight of TPP (Examples 3 and 4 in the form of crosslinked bead polymers, Comparative Examples 1 and 2 in the form of free TPP) and 14.6 parts by weight of SAN copolymer (Comparative Example 1 in the form of uncrosslinked SAN, Example 3 partly in the form of uncrosslinked SAN and partly in the form of crosslinked SAN bead polymer containing TPP, Comparative Example 2 in the form of crosslinked SAN bead polymer and Example 4 partly in the form of crosslinked SAN bead polymer and partly in the form of crosslinked SAN bead polymer containing TPP).

It may be concluded from Tables 1 and 2 that encapsulating the TPP in a crosslinked SAN matrix
- increases the heat resistance and the melt viscosity of the plastic rendered flame retardant,
- improves the juicing behaviour thereof, i.e. the tendency of the flame retardant additive to bleed or vapourise is reduced (lower loss of mass in the TGA experiment),
- the stress cracking resistance of the moulding composition is improved,
- the notched impact strength of the moulding composition is unaffected and
- good (improved) flame resistance is achieved.

What is claimed is:

1. Crosslinked bead polymers prepared from olefinically unsaturated compounds and at least one halogen-free phosphorus compound having an average particle size of 1 to 1000 μm, wherein the halogen-free phosphorus compound includes triphenyl phosphate.

2. Crosslinked bead polymers prepared from olefinically unsaturated compounds and at least one halogen-free phosphorus compound according to claim 1 having an average particle size of 5–100 μm.

3. Bead polymers according to claim 1 prepared from
   A) copolymer prepared from
      a) 70 to 99.7 wt. % of monoolefinically unsaturated compounds
      b) 0.3 to 30 wt. % of polyolefinically unsaturated compounds, and
   B) at least one halogen-free phosphorus compound,
   wherein the content of phosphorus compound B) is 5 to 95 wt. %, relative to the bead polymer.

4. Bead polymers according to claim 3, wherein the content of phosphorus compound B) is 30 to 95 wt. %, relative to the bead polymer.

5. Bead polymers according to claim 1 containing as halogen-free phosphorus compound at least one component of the general formula (I)

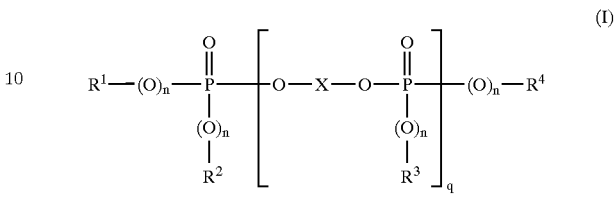

in which
R$^1$, R$^2$, R$^3$ and R$^4$ mutually independently each mean a C$_1$ to C$_8$ alkyl, a C$_5$ to C$_8$ cycloalkyl optionally substituted by alkyl, an optionally likewise substituted C$_8$ to C$_{20}$ aryl or a C$_7$ to C$_{12}$ aralkyl,
n mutually independently mean 0 or 1,
q means an integer between 0 and 30,
X means a mono- or polynuclear aromatic residue having 6 to 30 C atoms, or a linear or branched aliphatic residue having 2 to 30 C atoms, which may be OH-substituted and contain up to 8 ether bonds.

6. Process for the production of bead polymers according to claim 1 characterised in that
   I) an organic phase prepared from
      5 to 95 wt. % of a monomer mixture prepared from
         a) 70 to 99.7 wt. % of monoolefinically unsaturated compounds
         b) 0.3 to 30 wt. % of polyolefinically unsaturated compounds and
      5 to 95 wt. % of at least one halogen-free phosphorus compound,
      at least one initiator, and
      optionally an organic solvent sparingly miscible or immiscible with water, is finely dispersed
   II) in an aqueous phase prepared from
      water,
      at least one dispersant,
      and optionally a seed polymer with stirring at temperatures of between 0° C. and 60° C.,
   III) then polymerisation is performed with an increase in temperature and with stirring and
   IV) subsequently any optionally present volatile, organic substances are separated and the resultant bead polymer is isolated, washed and dried.

7. Compositions containing at least one thermoplastic polymer and one bead polymer according to claim 1.

8. Composition according to claim 7 containing at least one thermoplastic polymer selected from the group consisting of homo- and copolymers of olefinically unsaturated monomers, polystyrenes, styrene/acrylonitrile copolymers, (vinyl) graft polymers containing rubber, vinyl chloride homo- and copolymers, polyacrylates, vinyl acetate copolymers, polyacetals, polycarbonates, polyesters, polyester carbonates, polyamides polyester amides, polyphenylene oxides, polyphenylene sulfides, polysulfones, polyether sulfones and polyether ketones.

9. Composition according to claim 7 containing polymers selected from the group consisting of polycarbonate, polyester, polyester carbonate, polyamide, polyester amide, polyphenylene oxide, polyphenylene sulfide, impact-modifiers, vinyl polymers and mixtures thereof.

10. A molded article comprising a thermoplastic resin and the crosslinked bead of claim 1.

11. The molded article of claim 10 wherein thermoplastic resin is aromatic polycarbonate.

12. The molded article of claim 11 wherein thermoplastic resin is impact modified polycarbonate.

13. A process for the production of bead polymers comprising
   (I) preparing an organic phase that contains 5 to 95% relative to the weight of the phase of a monomer mixture of
      a) 70 to 99.7% relative to the weight of the mixture of at least one monoolefinically unsaturated compound and
      b) 0.3 to 30% relative to the mixture of at least one polyolefinically unsaturated compound and
   5 to 95% relative to the weight of the phase of at least one halogen-free phosphorus compound, and at least one initiator, and optionally an organic solvent sparingly miscible or immiscible with water, wherein the at least one halogen-free phosphorus compound includes triphenyl phosphate and
   (II) finely dispersing the organic phase in an aqueous phase that contains water, at least one dispersant, and optionally a seed polymer with stirring at temperatures of 0 to 60° C., and
   III) polymerizing the dispersed organic phase at elevated temperature and with stirring to obtain a bead polymer and
   IV) separating the resultant bead polymer from any optionally present volatile, organic substances, and
   V) washing and drying the separated bead polymer.

14. The bead polymer obtained by the process of claim 13.

* * * * *